July 29, 1969 R. H. McMANN, JR 3,458,652

GAMMA CORRECTION CIRCUIT

Filed April 22, 1966

INVENTOR.
RENVILLE H. McMANN, JR.

BY

Brumbaugh, Free, Graves & Donohue his ATTORNEYS 3,458,652
Patented July 29, 1969

3,458,652

GAMMA CORRECTION CIRCUIT

Renville H. McMann, Jr., New Canaan, Conn., assignor to Columbia Broadcasting System, Inc., New York, N.Y., a corporation of New York Filed Apr. 22, 1966, Ser. No. 544,573
Int. Cl. H04n 3/16, 5/38
U.S. Cl. 178—7.3 7 Claims

ABSTRACT OF THE DISCLOSURE

As described herein, the low amplitude levels of a derived video signal are first stretched and thereafter double differentiated and a composite video signal having stretched low amplitude level portions is provided. The modified composite signal is then combined with the double differentiated stretched signals to produce a video signal having uniform amplitude compensation.

Figure 1:
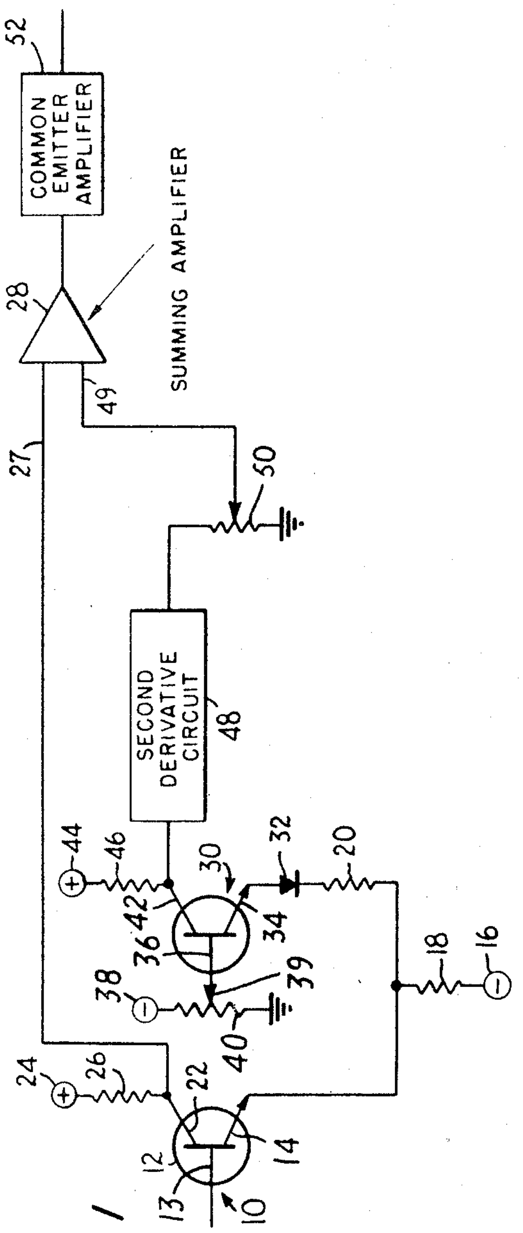

This invention relates to television, and more particularly, to apparatus which corrects the low brightness levels of the picture information signal without increasing the high frequency noise inherent therein.

The non-linear transfer characteristic of picture tubes and, to a lesser extent, most components of a standard television system has lead to the development of correction circuits which alter the video signal prior to its impression upon the control electrode of the picture tube. One such circuit is an amplitude compensating circuit which stretches the low brightness levels of the video signal to compensate for the exponential stretching of the white or high amplitude levels of the video signal by the picture tube.

Because high frequency noise signals are concentrated in the low level or gray-to-black areas of the video signal, most presently devised amplitude compensating circuits are frequency tuned and only stretch the low frequency, low amplitude levels of the video signal in order to avoid stretching of the high frequency noise signals. An apparent disadvantage with the use of such circuits lies in the fact that the video signal is not phase corrected. The reproduction of high resolution and quality images in the gray-to-black areas requires that any amplitude compensation be uniform so that the high frequency low amplitude levels of the video signal must be stretched to achieve this result.

It is an object of the invention accordingly to provide a new and improved amplitude compensating circuit which stretches the low brightness levels of the video signal at all frequencies and compensates for stretching of the high frequency noise signals inherent in the low amplitude levels of the signal.

This and other objects of the invention are accomplished by stretching the low amplitude levels of the derived video signal and providing a composite video signal at one output terminal and the stretched low amplitude level signals at a second output terminal, differentiating the stretched low amplitude level signals and combining the composite signal and the differentiated low amplitude level signals together to produce a video signal which possesses uniform amplitude compensation. Any stretching of the noise signals inherent in the low amplitude levels of the video signal is cancelled out by the combining of the two signals. In the embodiment of the invention, stretching of the low amplitude levels of the video signal is controlled by an amplifier and diode which vary the gain of an amplifier employed to produce the inverted composite signal and low level signals. So long as the diode conducts, the stretching of the signal takes place. When the diode becomes non-conducting, the stretching ceases and the video signal is amplified in the ordinary manner.

Figure 2:
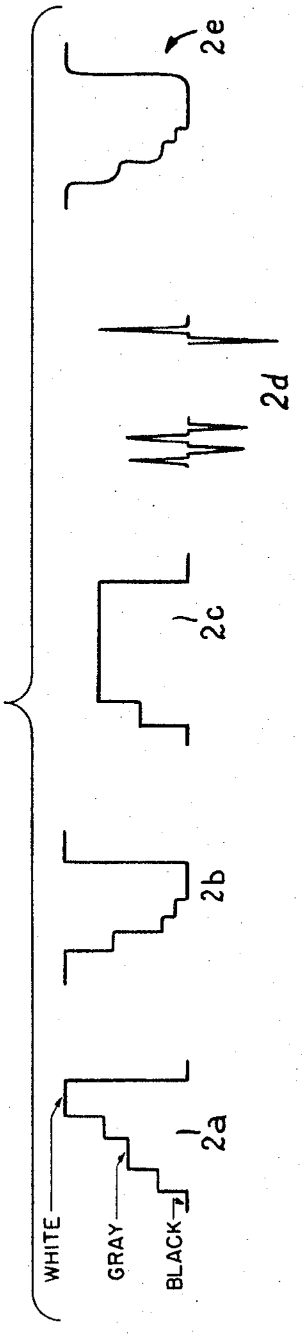

Further objects and advantages of the invention will be apparent to those skilled in the art from a reading of the following detailed description of a typical embodiment taken with reference to the accompanying drawing in which:

FIGURE 1 is a schematic diagram of an illustrative embodiment of the present invention; and FIGURE 2 illustrates waveforms at various points in FIGURE 1.

Referring now to FIGURE 1, a representative amplitude compensating apparatus according to the instant invention comprises a common emitter amplifier 10 which splits the phase of an applied input signal of proper phase. The transistor 12 employed in the amplifier 10 is of the NPN type with its base electrode 13 as the amplifier input and has its emitter 14 coupled to a biasing supply 16 through a swamping resistor 18 and to a resistor 20. The collector electrode 22 of the transistor is coupled to a biasing battery 24 through a load resistor 26 and to an input terminal 27 of a summing amplifier 28. When the transistor 12 is driven into conduction by the application of a positive pulse to its input terminal 13, current flows through the collector resistor 26 and through the emitter swamping resistor 18. As the base-emitter junction of the transistor 12 becomes more forwardly biased, increased current flowing through the resistors 26 and 18 produces an inverted signal at the collector 22 and an "in phase" signal at the emitter 14, respectively. Similarly, when the input signal opposes the forwardly biased base-emitter junction of the transistor 12, output signals are produced at the collector 22 and emitter 14 which are opposite in phase.

The gain of the amplifier 10 is controlled by an NPN transistor 30 and a diode 32, the transistor including an emitter 34 coupled to the resistor 20 through the diode 32, a base electrode 36 coupled to a negative biasing supply 38 through the adjustable tap 39 of a potentiometer 40 and a collector 42 connected to a biasing supply 44 through a load resistor 46. As long as the diode 32 is forward biased, the transistor 30 and the diode 32 conduct when the transistor 22 of the common emitter amplifier 10 is in its quiescent state. Forward biasing of the diode 32 is accomplished by making the value of load resistor 18 much larger than the value of resistor 20 and by adjusting the tap 39 of the potentiometer 40 such that only a small amount of negative voltage 38, in comparison to the magnitude of the biasing supply 16, is applied to the base electrode 36 of the transistor 30.

When the transistor 12 of the common emitter amplifier 10 starts to conduct, the transistor 30 remains conductive until the voltage drop across the resistor 18 becomes large enough to back bias the diode 32. It can be seen that, so long as the diode 32 and transistor 30 conduct, substantially all of the current flowing in the emitter circuit of the common emitter amplifier 10 is shunted through the resistor 20, the diode 32 and the transistor 30. When the diode is back biased, all the current flowing in the emitter circuit of the amplifier 10 flows through the resistor 18, thus developing a degenerative voltage across the resistor 18 which reduces the gain of the amplifier 10.

The collector 42 of the transistor 30 is further coupled to a second derivative circuit 48 which double differentiates an applied input signal to produce an output signal proportional to the second derivative of the input. One such circuit used with success in the instant invention includes a series connected pair of high pass resistance-capacitance networks, the first network differentiating an applied input signal and the second network differentiating the derivative of the input signal. The output of the differentiating circuit 48 is coupled to a second input terminal 49 of the summing amplifier 28 through a potentiometer 50 which is employed to vary the amplitude of the signals differentiated by the network 48.

When signals of different phase are applied to the input terminals 27 and 49 of the summing amplifier 28, the amplifier operates to add the two signals together and produce an output signal representative of the sum. While such circuits are conventional and any one of the many may be employed in the instant invention, the amplifier disclosed in the Sullivan Patent No. 3,011,018 has been used successfully in the instant invention. The amplitude compensating apparatus further includes a common emitter amplifier 52 coupled to the output terminal of the amplifier 28. Since the signal applied to the amplifier 28 is 180° out of phase with the signal applied to the amplifier 10, the amplifier 52 inverts the signal so as to align it with the phase of the input signal.

In operation, the television picture signal represented by the waveform 2*a* of FIGURE 2 is applied to the base electrode 13 of the transistor 12 and causes the transistor to conduct by forward biasing its base-emitter junction. Initially, the amplification of the applied video signal is great since substantially all of the current flowing in the emitter circuit of the amplifier 10 bypasses the swamping resistor 18 and passes through the diode 32 and the transistor 30. As the amplitude of the video signal increases, the current in the emitter circuit of the amplifier 10 increases until the diode 32 is reverse biased and the transistor 30 cut-off. When this occurs, a degenerative voltage is developed across the resistor 18 which reduces the gain of the amplifier 10.

By proper selection of the value of the biasing voltage biasing voltage 38 applied to the base 36 of the transistor 30 and of the values of the resistors 18 and 20, the gain of the amplifier is controlled such that only the black-to-gray levels of the video signal represented by the waveform 2*a* are stretched. In the middle to higher amplitude levels of the video signal, the diode 32 stops conducting, a considerable reverse voltage is developed across the resistor 18, and the gain of the transistor 12 is reduced so that the high amplitude levels are not stretched. The waveform 2*b* illustrates the inverted composite signal produced at the collector 22 of the transistor 12 having stretch in the low amplitude levels, and the waveform 2*c* illustrates the stretched low amplitude levels of the signal produced in the collector circuit of the transistor 30.

The stretched low amplitude level signals from the transistor 30 are applied to the double-differentiating circuits 48 and produced as output signals which are proportional to the second derivative of the input signals, as shown in the waveform 2*d* of FIGURE 2. Thereupon, the double-differentiated signals are applied through the potentiometer 50 to the second input terminal 49 of the summing amplifier 28. Adjustment of the potentiometer 50 is dependent upon the amount of high frequency noise which appears in the stretched low amplitude levels of inverted video signal of the waveform 2*b*. Where there has been extreme stretching of the noise signals, the potentiometer 50 is adjusted such that there is substantially no voltage drop across the potentiometer. When only minimal stretching of the noise signals has occurred, the potentiometer 50 is adjusted so that a greater proportion of the differentiated signals is dropped across the potentiometer.

The inverted compositive video signal having the waveform 2*b* and the double-differentiated signals having the waveform 2*d* are added vectorially in the summing amplifier 28 wherein a video signal having a waveform similar to that designated 2*e* is produced. As shown, the video signal is phase compensated in that the low level amplitude portions corresponding to low brightness are rounded or "rolled-off" on both the high and low frequency sides of the video signal. By phase compensating both sides of the video signal, greater resolution of the reproduced image in the gray-to-black areas is achieved since the entire signal is corrected for the amount of white stretch exhibited by the picture tube of the television system.

The peaking and signal overshoot produced in the amplifier 10 occurs in the middle-to-high amplitude levels of the signal and does not affect the stretched low amplitude levels. Moreover, the overshoot may be clipped in the subsequent amplitude detection circuits which are employed in standard television systems. Thereupon, the phase compensated video signal is applied to the amplifier 52 and inverted. While in some instances inversion of the video signal is unnecessary, the amplifier 52 is provided for use in those television systems which do not employ phase inversion circuits after amplitude compensation.

It should be understood that the above-described embodiment of the present invention is illustrative and that the invention is suscepible to considerable modification. For example, the amplifiers employed in the apparatus may include tunnel diodes and other semiconductor devices rather than the NPN transistors illustrated. Accordingly all such modifications are intended to be included within the scope of the following claims.

I claim:

1. Amplitude compensation apparatus for television picture information signals comprising stretching means responsive to variable amplitude input signals for stretching selected low amplitude levels of said signals, means responsive to signal amplitude variations in the stretched signals to produce corresponding roll-off signal portions, and combining means for combining signals from the stretching means with the roll-off signal portions to provide full frequency amplitude compensated signals.

2. Apparatus as set forth in claim 1 wherein the stretching means provides both erect and inverted stretched output signals, the means for producing roll-off signal portions is responsive to erect signals from the stretching means, and the combining means combines the roll-off signal portions with the inverted stretched output signals.

3. Apparatus according to claim 1 wherein the means for producing roll-off signal portions comprises signal differentiating means producing signals corresponding to the second derivative of the stretched signals.

4. Apparatus as set forth in claim 1 wherein the stretching means stretches only the low amplitude levels of the input signals and including control means for controlling the amount of low amplitude stretch provided by the stretching means as a function of the amplitude of the input signals.

5. Apparatus as set forth in claim 4 wherein the control means includes a diode-amplifier combination coupled between the stretching means and the roll-off signal portion producing means for forming a conduction path between the stretching means and the roll-off signal producing means during the stretching of the low amplitude levels of the input signals.

6. Apparatus as set forth in claim 1 including variable impedance means coupled to the roll-off signal portion producing means for controlling the amplitude of the roll-off signal portions as a function of the noise inherent in the stretched amplitude levels.

7. Apparatus as set forth in claim 1 including phase inverter means coupled to said combining means for inverting the phase of said full frequency amplitude compensated signals.

(References on following page)

References Cited

UNITED STATES PATENTS

| | | | |
|---|---|---|---|
| 2,717,931 | 9/1955 | Duke | 179—171 |
| 3,352,969 | 11/1967 | Konings | 178—7.1 |
| 2,583,345 | 1/1952 | Schade. | |
| 3,153,207 | 10/1964 | Brown. | |

ROBERT L. GRIFFIN, Primary Examiner

ROBERT L. RICHARDSON, Assistant Examiner

U.S. Cl. X.R.

178—7.1; 328—143, 163; 330—21